US009426686B2

(12) United States Patent
Yi et al.

(10) Patent No.: US 9,426,686 B2
(45) Date of Patent: Aug. 23, 2016

(54) METHOD AND APPARATUS FOR INDICATING DOWNLINK CHANNEL MEASUREMENT AND METHOD AND APPARATUS PERFORMING DOWNLINK CHANNEL MEASUREMENT IN A RELAYING SYSTEM

(75) Inventors: Su Yi, Beijing (CN); Yu Zhang, Beijing (CN); Zhennian Sun, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 172 days.

(21) Appl. No.: 13/879,320

(22) PCT Filed: Aug. 5, 2011

(86) PCT No.: PCT/CN2011/078060
§ 371 (c)(1),
(2), (4) Date: May 28, 2013

(87) PCT Pub. No.: WO2013/020257
PCT Pub. Date: Feb. 14, 2013

(65) Prior Publication Data
US 2014/0192704 A1    Jul. 10, 2014

(51) Int. Cl.
H04W 24/10    (2009.01)
(52) U.S. Cl.
CPC .................................. H04W 24/10 (2013.01)
(58) Field of Classification Search
None
See application file for complete search history.

(56) References Cited

U.S. PATENT DOCUMENTS

| 5,956,642 A | 9/1999 | Larsson et al. |
| 2009/0227264 A1 | 9/2009 | Hwang et al. |

(Continued)

FOREIGN PATENT DOCUMENTS

| CN | 1245623 A | 2/2000 |
| CN | 101174887 A | 5/2008 |

(Continued)

OTHER PUBLICATIONS

Huawei et al., "Measurement Definitions for Resource-Restricted Measurements", 3GPP TSG RAN WG1 meeting #63bis, R1-110020, Jan. 17-21, 2011, 6 total pages.

Catt, "Remaining Issue on Aperiodic CSI Reporting", 3GPP TSG RAN WG1 Meeting #64, R1-110717, Feb. 21-25, 2011, 2 total pages.

(Continued)

*Primary Examiner* — Thai Nguyen
(74) *Attorney, Agent, or Firm* — Sughrue Mion, PLLC

(57) ABSTRACT

The present invention provides a method and apparatus for indicating downlink channel measurement and a method and apparatus for performing channel measurement. The method for indicating downlink channel measurement comprises: receiving information on interferes of a user equipment; generating, based on downlink subframe configuration information, a downlink channel measurement indication for each of possible combinations of the interferers, wherein the channel measurement indication is adapted to indicate a subframe group to be measured by a user equipment; and sending the downlink channel measurement indication to the user equipment so as to indicate the user equipment to perform corresponding downlink channel measurement. According to embodiments of the present invention, the subframe groups that are required to be measured by the user equipment may be determined with respect to possible combinations of interferers corresponding to different levels of interference. Thus, the user equipment may perform channel measurement for respective subframe groups. Therefore, the channel quality as determined in such way will be more accurate and reliable and better match the actual channel condition. Moreover, it also provides a possibility for the serving node to perform the scheduling more accurately and effectively.

16 Claims, 8 Drawing Sheets

(56) References Cited

U.S. PATENT DOCUMENTS

| | | | |
|---|---|---|---|
| 2010/0080139 A1 | 4/2010 | Palanki et al. | |
| 2010/0099415 A1 | 4/2010 | Li et al. | |
| 2013/0223258 A1* | 8/2013 | Seo .................... | H04W 24/02 370/252 |

FOREIGN PATENT DOCUMENTS

| | | | | |
|---|---|---|---|---|
| CN | 101237685 A | 8/2008 | | |
| CN | 101820636 A | 9/2010 | | |
| CN | 101820683 A | 9/2010 | | |
| CN | 101873625 A | 10/2010 | | |
| CN | 101998453 A | 3/2011 | | |
| JP | 2011-091785 A | 5/2011 | | |
| WO | WO 2009120478 A2 * | 10/2009 | .......... | H04J 11/0026 |

OTHER PUBLICATIONS

Panasonic, "Discussion on remaining issues in relay", 3GPP TSG RAN WG1 Meeting #64, R1-110775, Feb. 21-25, 2011, 4 total pages.

Communication dated Jun. 10, 2014, issued by the Japanese Patent Office in corresponding Application No. 2013-541189.

"Subframe Configuration for Relay Node Transmission and Reception in LTE-advanced FDD Mode", 3GPP TSG RAN WG1 Meeting #56. R1-090789, Athens, Greece, Feb. 9-13, 2009, 5 total pages.

Catt, "Interference Measurement over Muted RE", 3GPP TSG RAN WG1 Meeting #63bis, R1-110049, Jan. 17-21, 2011, 5 total pages.

Communication dated Sep. 14, 2015 from the Chinese Intellectual Property Office issued in corresponding application No. 201180059487.5.

* cited by examiner

METHOD AND APPARATUS FOR INDICATING DOWNLINK CHANNEL MEASUREMENT AND METHOD AND APPARATUS PERFORMING DOWNLINK CHANNEL MEASUREMENT IN A RELAYING SYSTEM

TECHNICAL FIELD

The present invention relates to the field of a mobile communication technology, and more particularly, relates to a method and apparatus for indicating downlink channel measurement in a relaying system and a method and apparatus for performing downlink channel measurement in a relaying system.

BACKGROUND

In 3GPP long-term evolution advanced (3GPP LTE-A) technology, the relay technology is adopted. The relay is a technology that processes and forwards received signals by a relay node to thereby expand radio coverage and enhance data throughput. The relay technology may improve the coverage of high data rate, group mobility, temporary network deployment and the throughput of a cell edge, and may also be used to provide the coverage in new areas. With the relay technology, a relay node (RN) divides a direct link from a base station (eNB) to a user equipment (UE) with a relatively poor quality into two links with relatively good qualities, i.e., an access link and a backhaul link, where the access link refers to the link between the RN and the UE, and the backhaul link refers to the link between the eNB and the RN.

The relay node is wirelessly connected to the radio access network via a donor cell (namely, the cell supporting the relaying). With regard to the relay node's spectrum usage, the operation of the relay node can be divided into:
  inband, in which case the eNB-RN link shares the same carrier frequency as RN-UE links. Rel-8 UEs should be able to connect to the donor cell in this case.
  outband, in which case the eNB-RN link does not operate in the same carrier frequency as RN-UE links. Rel-8 UEs should be able to connect to the donor cell in this case.

As is well known, the "Type 1" relay node as defined in 3GPP TR36.814 V9.0.0, is an inband relay node, characterized by:
  It controls cells, each of which appears to a UE as a separate cell distinct from the donor cell;
  The cells shall have their own Physical Cell IDs (defined in LTE Rel-8) and the relay node shall transmit its own synchronization channels, reference symbols, and etc.
  In the context of single-cell operation, the UE shall receive scheduling information and HARQ feedback directly from the relay node and send its control channels (SR/CQI/ACK) to the relay node;
  It shall appear as a Rel-8 eNB to Rel-8 UEs (i.e. be backwards compatible); and
  To LTE-Advanced UEs, it should be possible for a relay node to appear differently than Rel-8 eNB to allow for further performance enhancement.

Because the above "Type 1" relay node is an inband relay node, the backhaul link and the access link will use the same frequency band and thus the relay transmitter will cause interference on its own receiver. Therefore, it is infeasible for the backhaul link transmission and the access link transmission are performed simultaneously on the same frequency resource, unless sufficient isolation of outgoing signals with incoming signals is provided, for example, by means of specific, well separated and well isolated antenna structures.

One possible solution for handling the above interference problems is to operate the relay so that the RN is not transmitting data to the user equipment when it is supposed to receive data from the donor eNB (DeNB, an eNB supporting the relaying). In other words, "gaps" are created in an access link transmission. During these gaps, the RN will not transmit any information to the UE. These gaps, for example, may be created through configuring MBSFN subframes as illustrated in FIG. 1. As illustrated in FIG. 1, the RN-UE transmission uses a common subframe (as illustrated at the left side), while the eNB-RN transmission employs an MBSFN subframe (as illustrated in the right side). The transmission between eNB and RN will be facilitated by not allowing transmission between RN and UE within some subframes.

Thus, some subframes in a downlink radio frame are configured as the backhaul subframes for transmission from the DeNB to RN, while the other subframes are access subframes for transmission from the RN to the UE. Different macro cells often use different backhaul subframes configurations and thus, it is required to carefully design interference estimation and channel measurement in an environment wherein different backhaul subframes configuration are used in different macro cells, such that the measured channel quality matches the actual interference condition.

In the US patent publication US2010/0080139A1 filed on Sep. 28, 2009, there are disclosed techniques for supporting relay operation in a wireless communication systems. Based on the technical solution as disclosed in this patent application, the eNB will generate a bitmap that indicates the subframe configuration in multiple radio frames, wherein the bitmap may indicate the type of each subframe in radio frames, i.e., whether it is an MBSFN subframe or a normal subframe, or is a blank subframe or a normal subframe; the eNB transmits the generated bitmap to the UE; the UE, based on the type of the subframe as indicated by the bitmap, performs channel estimation or measurement for the normal subframe, but skips the channel estimation or measurement for the blank subframe or MBSFN subframe.

FIG. 2 schematically illustrates an interference model commonly used in LTE-A standardization community, wherein the desired signals during the downlink access subframes and the backhaul subframes are illustrated with solid lines and long dotted lines, respectively, and the interference signals during the access subframes and the backhaul subframed are illustrated with short dotted lines and chain dotted line respectively. During the backhaul subframes as illustrated with long dotted lines, the eNB may also schedule data for the macro UE (MUE) besides scheduling data for the RN; and the interference in the backhaul subframes mainly comes from eNBs. On the other hand, during the access subframes as illustrated with solid lines, the RN transmits data for the relay user equipment (RUE), and meanwhile eNBs also transmit data for respective MUEs. In this case, the interference in these access subframes comes from both RNs and eNBs.

As illustrated in FIG. 2, the interference may come from a neighboring cell. However, in actual application, the backhaul subframes configurations in respective neighboring cells may be different for various factors such as different traffic condition of each cell. Thus, the technical solution as proposed in the US patent may not work well in this case, due to measurement mismatch with the actual interference condition. Therefore, there is a need for a technical solution suitable for this condition in the art.

SUMMARY OF THE INVENTION

In view of the foregoing, the present invention discloses solutions for indicating downlink channel measurement and for performing downlink channel measurement, which provides a possibility for obtaining a channel quality that better matches the actual channel condition.

According to an aspect of present invention, there is provided a method for indicating downlink channel measurement in a relaying system. The method can comprise: receiving information on interferes of a user equipment; generating, based on downlink subframe configuration information, a downlink channel measurement indication for each of possible combinations of the interferers, wherein the downlink channel measurement indication is configured to indicate a subframe group to be measured by the user equipment; and sending the downlink channel measurement indication to the user equipment so as to indicate the user equipment to perform a corresponding downlink channel measurement.

According to one embodiment of the present invention, the method further can comprise: forming the possible combinations of the interferers of the user equipment.

According to another embodiment of the present invention, the method further can comprise: receiving the downlink subframe configuration information of neighboring cells.

According to a further embodiment of the present invention, the downlink subframe configuration information can be represented by bitmaps, and the channel measurement indication can be generated by performing, based on a type of the user equipment and properties of the interferers, a logic operation on the bitmaps representing corresponding downlink subframe configuration information.

According to a yet further embodiment of the present invention, the channel measurement indication can be represented by a bitmap.

According to a further embodiment of the present invention, the downlink subframe configuration information can comprise information on backhaul subframe configuration and information on almost blank subframe configuration.

According to another embodiment of the present invention, the interferers can be dominant interferes of the user equipment.

According to a still further embodiment of the present invention, the method further comprises performing scheduling for each subframe based on the channel quality for the subframe group reported by the user equipment.

According to a second aspect of the present invention, there is provided an apparatus for indicating downlink channel measurement in a relaying system. The apparatus can comprise: interferer information receiving unit, for receiving information on interferers of a user equipment; measurement indication generation unit, for generating, based on downlink subframe configuration information, a downlink channel measurement indication for each of possible combinations of the interferers, wherein the downlink channel measurement indication is configured to indicate a subframe group to be measured by the user equipment, and measurement indication sending unit, for sending the downlink channel measurement indication to the user equipment so as to indicate the user equipment to perform a corresponding downlink channel measurement.

According to a third aspect of the present invention, there is provided a method for performing downlink channel measurement in a relaying system, comprising reporting information on interferers of a user equipment to its serving node, receiving a downlink channel measurement indication from the serving node, wherein the downlink channel measurement indication is adapted to indicate a subframe group to be measured by the user equipment, and performing the downlink channel measurement for the subframe group based on the downlink channel measurement indication.

According to a fourth aspect of the present invention, there is provided an apparatus for performing downlink channel measurement in a relaying system. The apparatus can comprise: interferer information reporting unit, for reporting information on interferers of a user equipment to its serving node, measurement indication receiving unit, for receiving a downlink channel measurement indication from the serving node, wherein the downlink channel measurement indication is adapted to indicate a subframe group to be measured by the user equipment, and channel measurement unit, for performing the downlink channel measurement for the subframe group based on the downlink channel measurement indication.

With embodiments of the present invention, respective subframe groups that need to be measured by the user equipment may be determined for possible combinations of interferers corresponding to different levels of interference, that is to say, the subframes subjected to the same level of interference are grouped into a set, thereby forming one or more subframe groups. These subframe groups represented by bitmaps are transmitted to the user equipment as the downlink measurement indication. Thus, the user equipment can perform channel quality measurement for respective subframe groups corresponding to different levels of interference, based on the channel measurement indication, respectively. Therefore, the channel quality as determined based on the embodiments of the present invention is more accurate and reliable, and better matches the actual channel condition. Further, it also provides a possibility for the serving node to schedule more accurately and effectively.

BRIEF DESCRIPTION OF THE DRAWINGS

The above and other features of the present invention will become more apparent through detailed explanation on the embodiments as illustrated in the embodiments with reference to the accompanying drawings. Like reference numbers represent same or similar components throughout the accompanying drawings of the present invention, wherein.

DETAILED DESCRIPTION OF EMBODIMENTS

Hereinafter, a method and apparatus for indicating downlink channel measurement and a method and apparatus for performing downlink channel measurement as provided in the present invention will be described in detail through embodiments with reference to the accompanying drawings. It should be understood that these embodiments are presented only to enable those skilled in the art to better understand and implement the present invention, not intend for limiting the scope of the present invention in any manner.

It should be first noted that this invention is illustrated in particular sequences for performing the steps of the methods. However, these methods are not necessarily performed strictly according to the illustrated sequences, and they can be performed in reverse sequence or simultaneously based on natures of respective method steps. Beside, the indefinite article "a/an" as used herein does not exclude a plurality of such steps, units, devices, and objects, and etc.

Furthermore, it should be noted that the term "combination" is used herein, which can be understood as the mathematics concept "combination", i.e. groups formed by selecting, from n different elements, m (m≤n) elements. Accordingly, "possible combinations" can be understood as groups formed by selecting, from n different elements, m elements, wherein m=1, . . . , and n; and "possible combinations of the interferers" means groups formed by selecting, from n interferers, m interferers, wherein m=1, . . . , n. However, the impossible group which can not exist in a practical application can also be excluded from the formed groups based on the properties of the interferers.

Next, reference will be made to FIG. 3 to describe a method for indicating downlink channel measurement according to an embodiment of the present invention.

Figure 1:
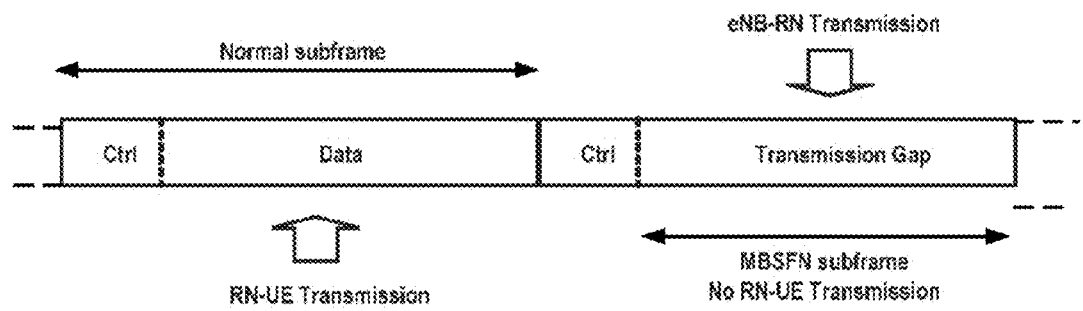
FIG. 1 schematically illustrates an example of a downlink subframe configuration in the prior art.
Figure 2:
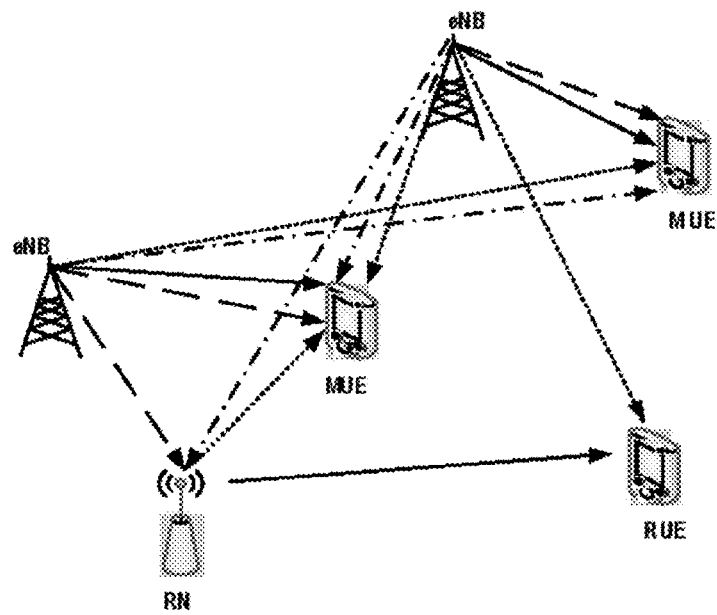
FIG. 2 schematically illustrates an interference model commonly used in the LTE-A standardization community.
Figure 3:
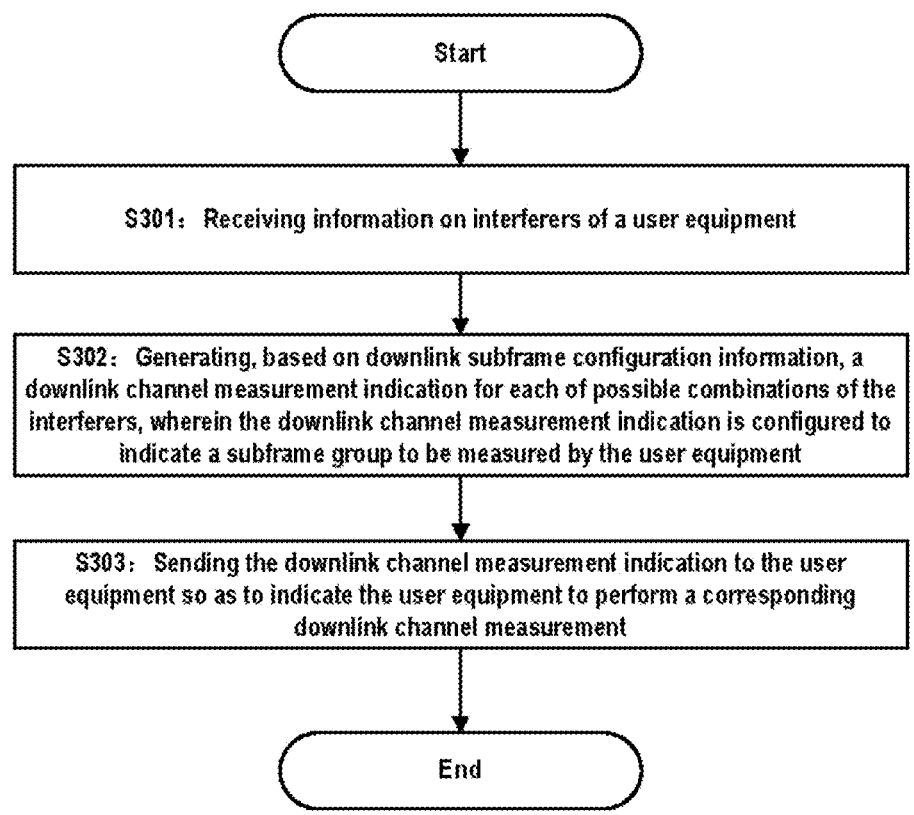
FIG. 3 schematically illustrates a flowchart of a method for indicating downlink channel measurement according to an embodiment of the present invention.

As indicated in FIG. 3, first, at step S301, the interferer information transmitted from the user equipment is received.

As previously mentioned, when receiving information, each UE is always influenced by interferers such as eNB, RN, and etc. The UE may determine the sources of the interference information, i.e., each interferer, based on the received interference information. This operation may be periodically executed based on a predetermined period of time.

The interferer information may be reported to a serving node of the UE, i.e., an eNB or a RN, by means of any suitable message. Preferably, the UE merely reports dominant interferers, namely, i.e., interferers that are dominant among all interferers, for example, several interferers having a higher level of interference to the UE. The number of dominant interferers may be selected at will. However, two dominant interferers are preferable, because it may sufficiently reflect interference condition of the UE, and moreover, resource consumption for the subsequent operations is less.

Next, at step S302, based on downlink subframe configuration information, a channel measurement indication for each of possible combinations of the interferers is generated, wherein the channel measurement indication is adapted to indicate a subframe group that needs to be measured by the UE.

As previously mentioned, the UE may be subjected to the interference from neighboring cells, while in different cells, the downlink subframe configurations might be different. Thus, it will cause mismatch with the actual interference condition, if the channel measurement is still performed to all downlink subframes altogether.

Therefore, the inventors contemplate of determining each subframe group that needs to be measured by the user equipment with respect to different levels of interference. It should be understood that different interferers have different levels of interference, thus different combinations of interferers correspond to different levels of interference. In the embodiments of the present invention, respective subframe groups subjected to different levels of interference may be determined through downlink subframe configuration information.

According to an embodiment of the present invention, the downlink subframe configuration information can comprise backhaul subframe configuration information and almost blank subframe (ABS) configuration information.

Particularly, such information may comprise backhaul subframe configuration information and almost blank subframe configuration information of the cell where the UE is located and/or a neighboring cell.

During the operations, the eNB exchanges the subframe configuration information of the cell that it serves with neighboring eNBs via X2 interface. The donor eNB may notify RNs of the downlink subframe configuration information of neighboring cells through RRC signaling or by eNB broadcasting. Thus, in this case, the method can further comprise a step of receiving downlink subframe configuration information.

As previously mentioned, the interferer is a node or device that causes interference to the UE. UE may experience interference from different interferers simultaneously during different subframes. It may be understood that various possible combinations of interferers actually correspond to different levels of interference. Thus, for each possible combination of interferers, the subframe group in which a UE is interfered by these interferers may be determined and transmitted to the UE through downlink channel measurement indication to indicate the subframe groups.

This channel measurement indication may be determined based on the downlink subframe configuration information. According to an embodiment of the present invention, the downlink subframe configuration is represented by bitmaps, wherein the channel measurement indication is generated by performing logic operation on the bitmaps that represent the corresponding downlink subframe configuration information based on the type of the user equipment and the properties of the interferers. To enable those skilled in the art to thoroughly understand generation of the channel measurement indication, further description will be made with reference to several particular exemplary scenarios.

For the scenarios to be described as follows, it is assumed that: it is in a case of FDD and has a backhaul subframe configuration period of 8 ms; if the operations are performed at RN, the RN has obtained the downlink backhaul subframe configuration information of neighboring cells; and the UE has two dominant interferers. However, it should be noted that these assumptions are only for purpose of explanation of these scenarios, and they should not be considered as any limitation to the present invention.

Figure 4A:
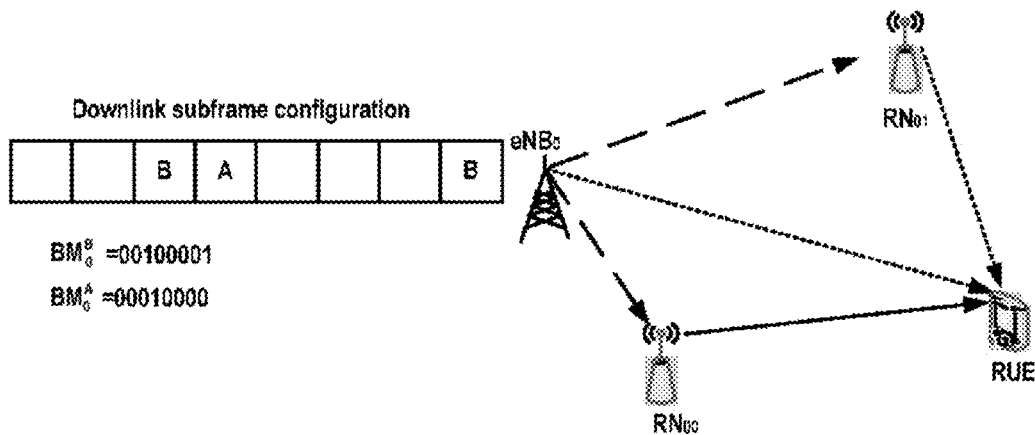
FIGS. 4A to 4D schematically illustrate several exemplary scenarios according to the present invention.

First, reference is made to FIG. 4A, which illustrates a scenario wherein the user equipment is RUE served by relay node $RN_{00}$, and the two dominant interferers are $eNB_0$ (the Donor eNB of the relay node that serves the RUE) and another relay node $RN_{01}$ which belongs to a same donor cell as RUE (i.e., other RN than the serving relay node of RUE). In FIG. 4A, a downlink subframe configuration diagram with a periodicity of 8 ms is illustrated near $eNB_0$, wherein one block represents one millisecond. In this configuration diagram, "B" is used to schematically illustrate the location for the downlink backhaul subframe, and "A" is used to schematically illustrate the location for the downlink ABS subframe, wherein the backhaul subframe is a subframe that is available for eNB to transmit information to RNs on the downlink, while the ABS subframe is an almost blank subframe only with necessary control information so as to reduce the interference of $eNB_0$ on other devices. The backhaul subframe configuration information of $eNB_0$ is represented by bitmap "$BM_0^B$" and in the illustrated example, it is "00100001," wherein "1" indicates the location of the backhaul subframe. Similarly, the ABS subframe configuration information of $eNB_0$ is represented by another bitmap "$BM_0^A$" and in the illustrated example, it is "00010000," wherein "1" indicates the location of the ABS subframe. It should be noted that these configurations are merely described in an exemplary manner. It could be understood that for different applications, these configurations may be different.

It can be understood that the RUE is subjected to interference only when the RUE is receiving data, thus the interfered subframe must be those downlink access subframe, i.e., the subframes as indicated by a bitmap obtained by performing a bitwise NOT operation on the backhaul subframe configuration $BM_0^B$, namely, $\overline{BM_0^B}$, wherein "1" indicates the location of the access subframe.

Because the backhaul subframe configurations in a same cell are identical, when $RN_{00}$ transmits information to the RUE, $RN_{01}$ also transmits information at the same time. Therefore in the illustrated scenario, the RUE will be subjected to the interference from $RN_{01}$, and there won't be a case where the RUE is subjected to the interference only from $eNB_0$. Besides, due to the fact that there can be two possibilities that $eNB_0$ transmits ABS subframe (which will not interfere with RUE) or non-ABS subframes (which will interfere with RUE), there will be two cases that the UE is only subjected to the interference from $RN_{01}$ ($eNB_0$ transmits ABS subframe) and the UE is subjected to the interference from both $eNB_0$ and $RN_{01}$ simultaneously ($eNB_0$ transmits non-ABS subframe). In other words, two possible combinations of interferers exist: C01: only $RN_{01}$; and C02: both $RN_{01}$ and $eNB_0$.

For the possible combination of interferers C01, the subframe group that is subjected to its interference can be determined based on the downlink subframe configuration $BM_0^B$ and $BM_0^A$ as below:

$\overline{BM_0^B}$ & $BM_0^A$=00010000, namely, comprising only subframe 3.

For the possible combination of interferers C02, the subframe group that is subjected to its interference may also be determined based on the downlink subframe configuration $BM_0^B$ and $BM_0^A$ as below:

$\overline{BM_0^B}$ & $\overline{BM_0^A}$=11001110, namely, comprising subframes 0, 1, 4, 5, and 6.

Figure 4B:
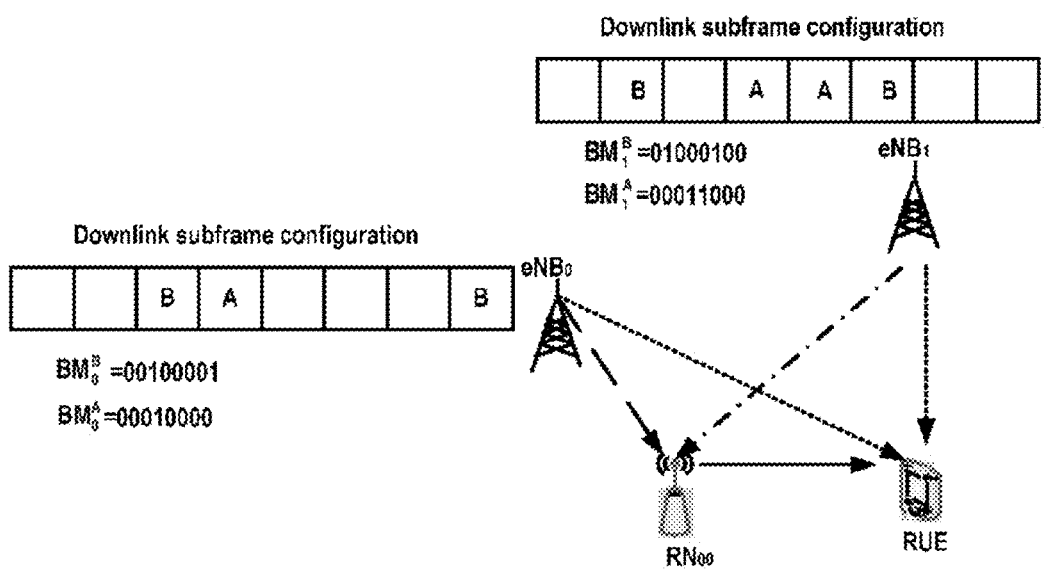

FIG. 4B illustrates another scenario, wherein the two dominant interferes of the RUE are $eNB_0$ (Donor eNB of $RN_{00}$) and eNB1 of a neighboring cell. Different from the scenario as illustrated in FIG. 4A, in FIG. 4B, one of the dominant interferers of RUE is $eNB_1$ in a neighboring cell. Near $eNB_1$, the downlink subframe configuration of the neighboring cell is illustrated, wherein as illustrated in FIG. 4B, the downlink backhaul subframe configuration is represented by bitmap "$BM_1^B$", while the ABS subframe configuration is represented by another bitmap "$BM_1^A$".

Since $eNB_0$ and $eNB_1$ can have two possibilities of transmitting ABS subframe or transmitting non-ABS subframes respectively, three possible combinations of interferers exist: C11: $eNB_0$; C12: $eNB_1$; and C13: both $eNB_0$ and $eNB_1$.

Similar to determining the interfered subframe groups in the scenario of FIG. 4A, for C11, C12, and C13, the respective subframe group that is subjected to interference may be determined based on the downlink subframe configuration $BM_0^B$, $BM_0^A$, and $BM_1^A$ as follows.

C11: $\overline{BM_0^B}$ & $\overline{BM_0^A}$ & $BM_1^A$=00001000, namely comprising subframe 4;

C12: $\overline{BM_0^B}$ & $\overline{BM_0^A}$ & $\overline{BM_1^A}$=00000000, namely being null; and C13: $\overline{BM_0^B}$ & $\overline{BM_0^A}$ & $\overline{BM_1^A}$=11000110, namely comprising subframes 0, 1, 5, and 6.

Figure 4C:
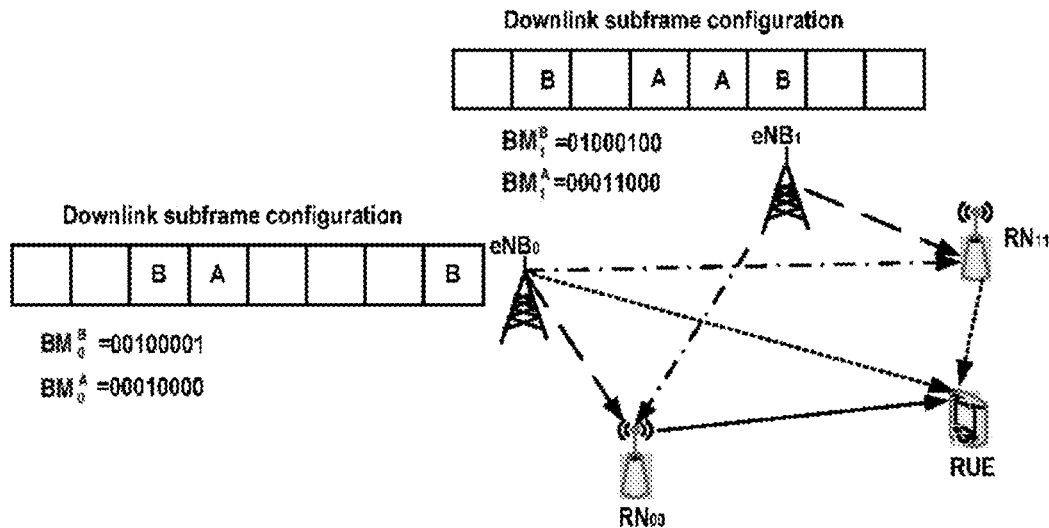

FIG. 4C illustrates a further scenario, wherein the two dominant interferes are base station $eNB_0$ and $RN_{11}$ in a neighboring cell. Because $eNB_0$ can have two possibilities of transmitting ABS subframe or transmitting non-ABS subframes, and RN11 can have two possibilities of transmitting in the access subframes or receiving in backhaul subframes, three possible combinations of interferers exist: C21: $eNB_0$; C22: $RN_{11}$; and C23: both $eNB_0$ and $RN_{11}$.

Similar to determining the interfered subframe groups in the scenario of FIG. 4A and FIG. 4B, for C21, C22, and C23, respective subframe groups can be determined based on the downlink subframe configuration $BM_0^B$, $BM_0^A$, $BM_1^B$ and $BM_1^A$ as below:

C21: $\overline{BM_0^B}$ & $\overline{BM_0^A}$ & $BM_1^B$=01000100, namely comprising subframes 1 and 5;

C22: $\overline{BM_0^B}$ & $\overline{BM_0^A}$ & $\overline{BM_1^B}$=00010000, namely comprising only subframe 3; and C23: $\overline{BM_0^B}$ & $\overline{BM_0^A}$ & $\overline{BM_1^B}$=10001010, namely comprising subframes 0, 4, and 6.

Figure 4D:
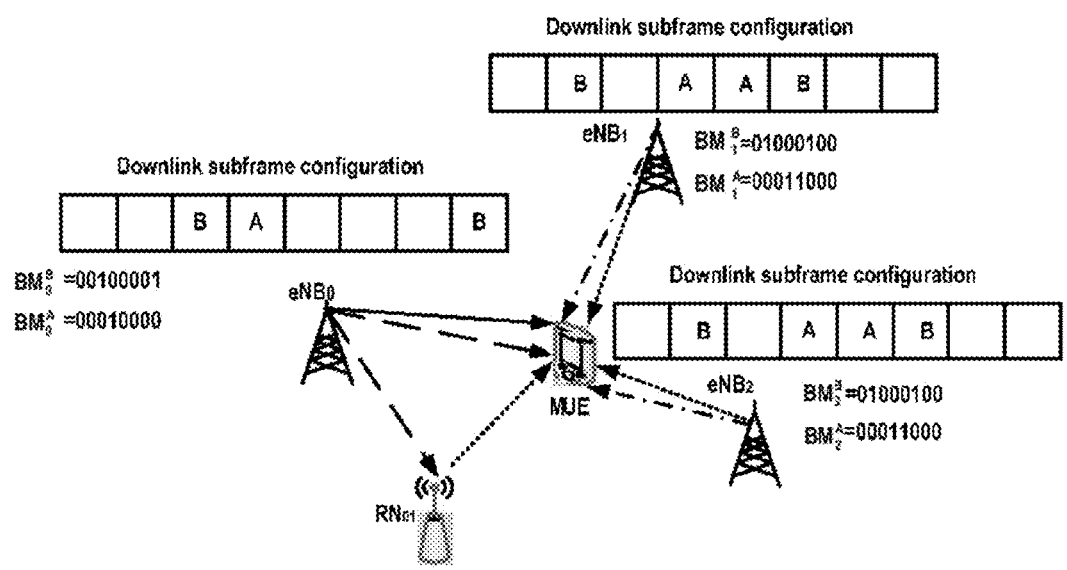

FIG. 4D further illustrates a yet further exemplary scenario wherein the user equipment is MUE. In this example, two dominant interferers of the MUE are $eNB_1$ and $eNB_2$ in two neighboring cells respectively, wherein, near the $eNB_1$ and $eNB_2$ are illustrated the downlink subframe configurations of the two neighboring cells respectively. Different from the scenarios as illustrated in FIG. 4A to FIG. 4C, the MUE is subjected to interference when receiving data from eNB, thus the subframes subjected to the interference should be those indicated by a bitmap (namely, $\overline{BM_0^A}$) obtained by performing a bitwise NOT operation on $BM_0^A$.

Likewise, because $eNB_1$ and $eNB_2$ have two possibilities of transmitting ABS subframe or transmitting non-ABS subframe respectively, in this scenario, three possible combinations of interferers exist: C31: eNB1; C32: eNB2; C33: both eNB1 and eNB2.

For C31, C32, and C33, the respective subframe groups can be determined based on downlink subframe configuration $BM_0^A$, $BM_1^A$, $BM_1^A$ as below:

C31: $\overline{BM_0^A}$ & $\overline{BM_1^A}$ & $BM_2^A$=00000000, namely being null;

C32: $\overline{BM_0^A}$ & $BM_1^A$ & $\overline{BM_2^A}$=00000000, namely being null; and C33: $\overline{BM_0^A}$ & $\overline{BM_1^A}$ & $\overline{BM_2^A}$=11100111, namely, comprising subframes 0, 1, 2, 5, 6 and 7.

From the above determination of subframe groups, it can be seen that the determination of the subframe groups depends on the type of the user equipment and the property information of the interferers, namely, the type of the interferers and association information of the interferers (i.e., belonging to which cell).

It is undoubted that those skilled in the art, can determine, based on the teaching here, the subframe groups for the RUE and MUE that are subjected to various levels of interference in other scenarios. Therefore, for the sake of simplicity, they will not be detailed here.

Respective subframe groups as determined above may be transmitted to UE as a downlink channel measurement indication. The transmission of subframe group which is null can be omitted. This channel measurement indication is preferably in a form of bitmap. However, the present invention is not limited hereto. Those skilled in the art would appreciate that any other form of channel measurement indication may also be adopted to indicate respective subframe groups.

Next, reference is made to FIG. 3 again, and at step S303, the channel measurement indication is transmitted to the user equipment to indicate the user equipment to perform a corresponding downlink channel measurement.

The subframe groups as determined here may be transmitted to the UE in one channel measurement indication or in several channel measurement indications. In this way, the UE may perform the corresponding downlink channel measurement with respect to respective subframe groups based on the channel measurement indication and report the measured channel quality for each of the subframe groups to it's serving node eNB or RN. With regard to UE's operations, detailed description will be made hereinafter. Thus, in an embodiment of the present invention, the method can also comprise performing scheduling for each subframe based on the channel quality for the subframe group reported by the user equipment.

From the above description, it can be seen that possible combinations of interferers actually correspond to different levels of interference, and respective subframe groups as determined for such combinations are actually the respective subframe groups that are subjected to different levels of interference, while all subframes in a subframe group are subjected to a same level of interference. Therefore, the user equipment may respectively perform channel measurement for respective subframe groups based on the downlink channel measurement indication for indicating respective subframe groups. Therefore, the channel quality as determined in such way will be more accurate and reliable and better match the actual channel condition. Moreover, based on the channel quality as determined in such way, it is also possible for the serving node to carrying out the scheduling more accurately and effectively.

Hereinbefore, it is described how to generate a downlink channel measurement indication for UE with respect to a plurality of particular scenarios. However, the present invention is not limited hereto, but may be applied to various different scenarios. Hereinafter, a more generic solution will be described with reference to further embodiments.

Here, it is likewise assumed that: it is in a case of FDD and has a backhaul subframe configuration period of 8 ms; if the operations are performed at RN, the RN has obtained the downlink backhaul subframe configuration information of neighboring cells; and the UE has two dominant interferers.

Based on the type of the UE as concerned, UE may be RUE (i.e., the UE served by the relay node) and MUE (i.e., the UE directly served by the base station eNB). For the sake of simplicity, for the RUE, its serving relay node is named as $RN_{00}$, while the DeNB for the relay node $RN_{00}$ is named as $eNB_0$; for MUE, its serving base station is also named as $eNB_0$. Thus, the dominant interfering node (i.e., interferer) may be $eNB_i$ or $RN_{ij}$, wherein i denotes the index of the base station eNB, j denotes the jth RN that served by $eNB_i$, wherein for example, i=0, 1, 2; and j=1, 2. The bitmap of the $eNB_i$ downlink backhaul subframe configuration is represented by $BM_i^B$, wherein "1" indicates the location of a backhaul subframe; the ABS subframe configuration of $eNB_i$ is represented by $BM_i^A$, wherein "1" denotes the location of ABS subframe. For the sake of explanation, $\Omega_b$ and $\Omega_r$ can be used to denote a set of interfering base station (eNB) and a set of interfering relay node (RN) for a UE, respectively. It can be understood that, for different scenarios, $\Omega_b$ can be different, for example, { }, {$eNB_0$}, {$eNB_1$}, {$eNB_0$, $eNB_1$}, {$eNB_1$, $eNB_2$}, or the like; and $\Omega_r$ can also be different, for example { }, {$RN_{01}$}, {$RN_{01}$, $RN_{02}$}, {$RN_{11}$}, {$RN_{01}$, $RN_{11}$}, {$RN_{11}$, $RN_{12}$}, {$RN_{11}$, $RN_{21}$}, or the like.

In the case that the UE has two dominant interferers, for example represented by $I_1$ and $I_2$, the possible combinations of interferers can be determined, for example, based on the mathematics concept "combination" mentioned hereinabove, as: C1: $I_1$; C2: $I_2$; and C3: both $I_1$ and $I_2$.

As previously mentioned, the concerned subframes should be those subframes for transmission to UE, namely $\overline{BM_0^x}$, wherein x depends on the type of the user equipment, and particularly, when the concerned UE is RUE, x=A; and when the UE is MUE, x=B. Additionally, it may be understood that being interfered by $I_1$ means that $I_1$ is transmitting data at this subframe, namely, corresponding to $\overline{BM_k^y}$, wherein k is the index of the DeNB of the interferer when the interferer is RN and it is the index of the base station when the interferer is a base station; and wherein y=A when the interferer is a base station and y=B when the interferer is RN. On the other hand, it can be appreciated that $BM_k^y$, indicates the circumstance where the UE is not subjected to the $I_1$ interference. Similarly, the circumstance of being subjected to the interference from $I_2$ corresponds to $\overline{BM_m^z}$; the circumstance of not being subjected to the interference from $I_2$ corresponds to $\overline{BM_m^z}$, wherein the determination of values of z and m is similar to y and k, which will not be detailed herein.

Thus, for the above mentioned three possible combinations of interferers C1, C2, and C3, the three interfered subframe groups may be determined below:

The subframe group only interfered by $I_1$: $\overline{BM_0^x}$ & $\overline{BM_k^y}$ & $BM_m^z$ The subframe group only interfered by $I_2$: $\overline{BM_0^x}$ & $BM_k^y$, & $\overline{BM_m^z}$ The subframe group interfered by $I_1$ and $I_2$: $\overline{BM_0^x}$ & $\overline{BM_k^y}$ & $\overline{BM_m^z}$ wherein, as previously mentioned,
- ● denotes the bitwise NOT of ●;
- & denotes bitwise AND;
- k is the index of $I_1$, if $I_1 \in \Omega_b$, i.e., $I_1$ is eNB; or k is the index of DeNB of $I_1$ if $I_1 \in \Omega_r$, i.e., $I_1$ is RN;
- m is the index of $I_2$, if $I_2 \in \Omega_b$; or m is the index of DeNB of $I_2$, if $I_2 \in \Omega_r$;

$$x \to \begin{cases} A, & \text{if it's } MUE \\ B, & \text{if it's } RUE \end{cases};$$

$$y \to \begin{cases} A, & \text{if } I_1 \in \Omega_b \\ B, & \text{if } I_1 \in \Omega_r \end{cases};$$

and

-continued $$Z \rightarrow \begin{cases} A, \text{ if } I_2 \in \Omega_b \\ B, \text{ if } I_2 \in \Omega_r \end{cases}.$$

In this way, the subframe groups for possible combinations of interferers (i.e., for different levels of interference) may be determined under any scenarios based on the above formulas. Next, these determined subframe groups may be transmitted as downlink channel measurement indications to the user equipment UE, so as to indicate the UE to perform a corresponding downlink channel measurement. If feedback overhead is a concern, two or more groups can be combined when generating the channel measurement indications to reduce the number of CSI feedback groups.

It should be noted that, although in the above described generic embodiment, the sets $\Omega_b$ and $\Omega_r$ are defined, the present invention is not limited thereto. Actually, when determining the values of k, m, x, y, and z, they may also be directly determined based on whether $I_1$ or $I_2$ is base station or relay node, without determining whether they belong to sets $\Omega_b$ or $\Omega_r$.

Here, when determining possible combinations of interferers, the impossible combination that can not exist in a particular scenario is not considered, because in the subsequent calculation, this impossibly existing combination will obtain a null subframe group. For a particular application, this possible combination of interferers may be pre-determined for each scenario, as described in the above particular scenarios in FIG. 4A to 4D. However, the possible combinations of interferers may be automatically formed during the operations, for example, based on the mathematics concept "combination".

Besides, it should be noted that the above description has been made with reference to the embodiments of 2 dominant interferers, but the present invention is not limited thereto. Actually, the interferers as reported by the UE are not limited to dominant interferers, but may be all interferers that affect the UE or part of interferers selected in other manner. On the other hand, the number of dominant interferers is not limited to 2, but may be any other suitable number, although 2 dominant interferers are enough from the perspective of practical application. Those skilled in the art may understand, in the case that the number of interferers is greater than 2, the items participating in the logic operation will increase accordingly. However, based on the teaching provided herein, those skilled in the art may easily implement the technical solution in the case of other number of interferers. Thus, for the sake of simplicity, it will not be detailed here.

Next, a flow chart of a method for performing channel measurement at UE will be described in detail with reference to FIG. 5.

Figure 5:
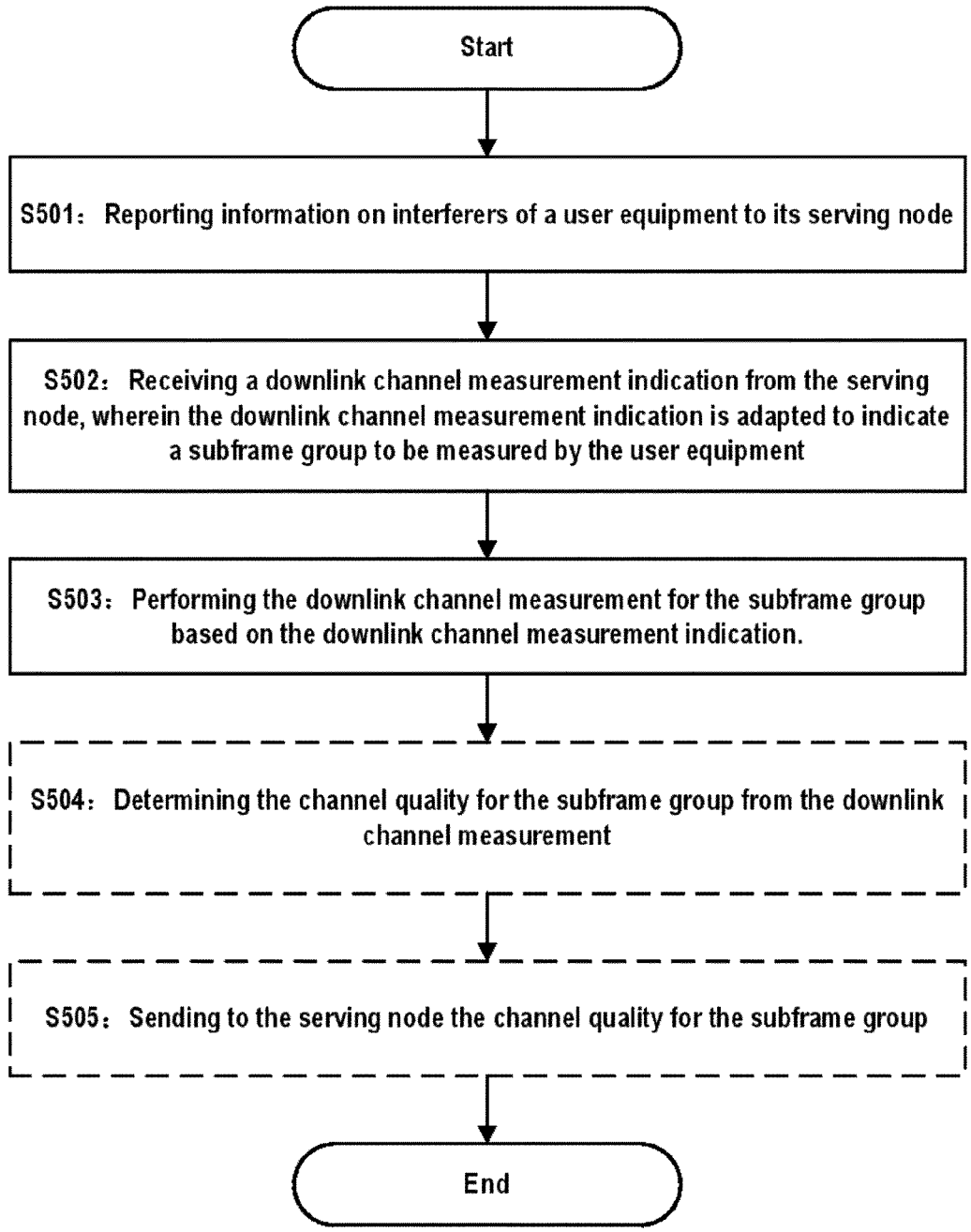
FIG. 5 schematically illustrates a flowchart of a method for performing downlink channel measurement according to an embodiment of the present invention.

As illustrated in FIG. 5, at step S501, UE reports to its serving node (eNB or RN) the information on interferers of the UE. The information on interferers may be the interferers, particularly dominant interferers, as determined by the UE within a certain predetermined period of time. This predetermined period of time may be determined as required in actual application.

Next, at step S502, the UE receives the downlink channel measurement indication from its serving node, the channel measurement indication being configured to indicate respective subframe groups to be measured by the UE. This channel measurement indication is generated through determining by the serving node subframe groups for possible combinations of the interferers reported by the UE, as described with reference to FIGS. 3 to 4.

After that, at step S503, the UE performs channel measurement for respective subframe groups as indicated in the channel measurement indication.

After receiving the downlink channel measurement indication, the UE can parse the indication and obtain respective subframe groups therefrom. The UE can perform channel measurement for respective subframe groups, which means the UE may perform corresponding measurement with respect to different levels of interference. Therefore, a more accurate measurement may be obtained. The detailed operation of performing channel measurement follows the LTE standard, which will not be detailed herein.

Besides, preferably, the channel quality of respective subframe groups may be calculated at step S504 from the channel measurement as performed with respect to the respective subframe groups. Here, channel quality, for example, may be an average value of all measurement results for a subframe group as measured within a predetermined period of time, a sampled value during this period, or any other value that is suitable to represent the channel quality of this subframe group. Next, at step S505, the channel quality values of respective subframe groups are sent to the serving node of UE (eNB or RN).

Therefore, the serving node may schedule for respective subframes based on the CQI feedback, i.e., channel quality of respective subframe groups, and hence the scheduling will become more accurate and efficient.

Figure 6:
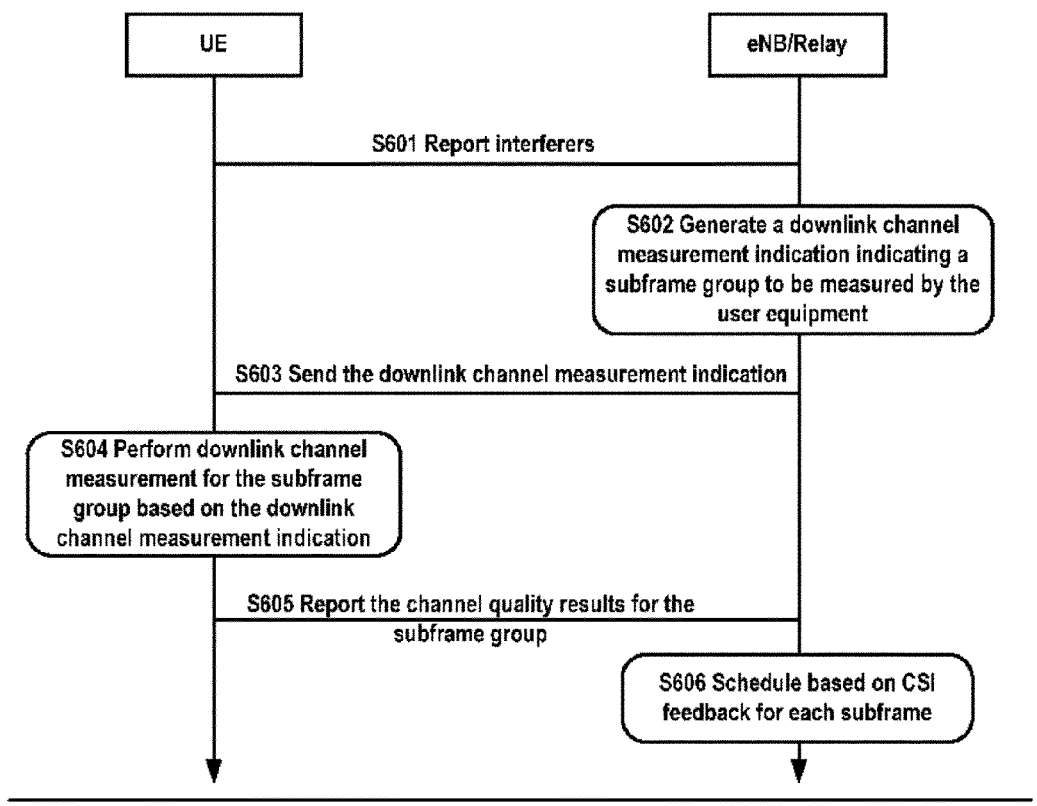
FIG. 6 schematically illustrates an operation flowchart according to a communication system of the present invention.

In addition, in order to enable those skilled in the art to further understand the present invention as a whole, the flowchart of the operation of the communication system according to the present invention will be briefed with reference to FIG. 6.

As illustrated in FIG. 6, first at step S601, UE reports to its serving node eNB or RN the information on interferers of the UE. Next, at step S602, the serving node eNB or RN receives the information on interferers and generates the downlink channel measurement indication with respect to various possible combinations of interferers, so as to indicate the subframe groups to be measured by the UE. Then, at step S603, the serving node eNB or RN sends the channel measurement indication to the UE. At step S604, the UE performs channel measurement with respect to respective subframe groups based on the channel measurement indication. At step S604, the UE may send the channel quality of respective subframe group as obtained from the measurement to the serving node eNB or RN. At step S606, the serving node eNB or RN will perform scheduling for each subframe based on the channel quality reported by the UE.

Furthermore, it should be noted that the examples in present invention have been described with respect to the FDD Application. However, the present invention is not limited thereto. For the TDD system, the backhaul link subframe configuration has a periodicity of 10 ms, instead of 8 ms. In this case, it is only required to change the length of the bitmap appropriately, i.e., modifying the length of the bitmap from 8 to the number of down link subframes in backhaul subframe configuration periodicity (10 ms), which varies from different TDD UL-DL configurations.

Additionally, if the downlink ABS configuration periodicity (for example 40 ms) is different from the downlink backhaul subframe configuration periodicity (10 ms), the ABS period periodicity can be used as the reference. That is to say, the backhaul subframe configuration can be repeated for several times to form a backhaul subframe configuration that has a same time length as the ABS configuration periodicity, so as to match the ABS subframe periodicity.

Further, it should also be noted that the present invention may be applied to both the CRS (Common Reference Signal) and CSI-RS (Channel State Information-Reference Signal) interference estimation. However, the CRS is preferable, because of the sparse duty cycle of CSI-RS.

Next, an apparatus for indicating downlink channel measurement as provided by the present invention will be described with reference to FIG. 7, which illustrates an apparatus 700 for indicating downlink channel measurement according to an embodiment of the present invention.

Figure 7:
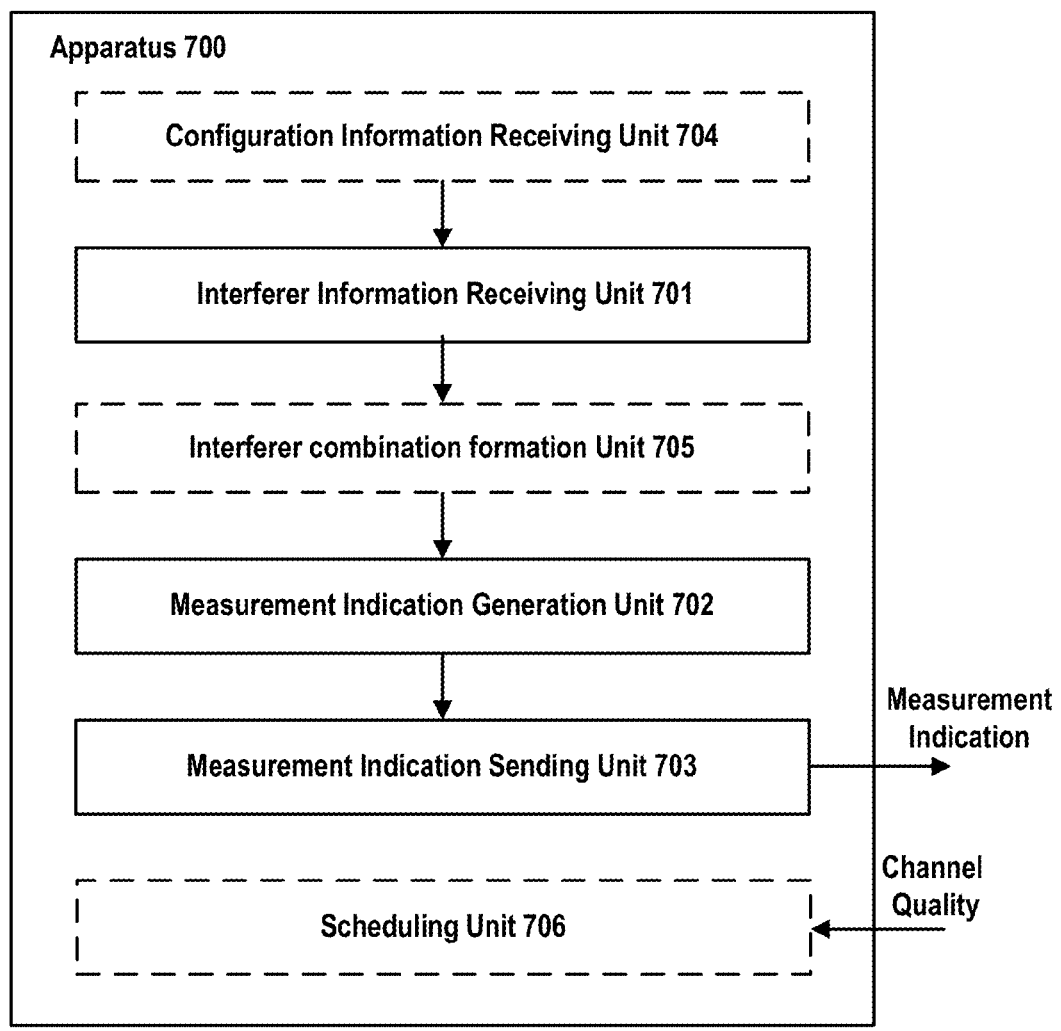
FIG. 7 schematically illustrates a block diagram of an apparatus for indicating downlink channel measurement according to an embodiment of the present invention.

As illustrated in FIG. 7, the apparatus 700 comprises: interferer information receiving unit 701, measurement indication generation unit 702, and measurement indication sending unit 703. The interferer information receiving unit 701 is configured to receive information on interferers of a user equipment; measurement indication generation unit 702 is configured to generate, based on downlink subframe configuration information, a channel measurement indication for each of possible combinations of the interferers, wherein the channel measurement indication is adapted to indicate subframe groups to be measured by the user equipment, and measurement indication sending unit 703 is configured to send the downlink channel measurement indication to the user equipment so as to indicate the user equipment to perform a corresponding downlink channel measurement.

In an embodiment according to the present invention, the apparatus 700 may further comprise: configuration information receiving unit 704 for receiving configuration information of downlink subframes of neighboring cells.

In another embodiment according to the present invention, the apparatus 700 may further comprise: interferer combination forming unit 705, for forming the possible combinations of the interferers.

In a further embodiment according to the present invention, the downlink subframe configuration information may be represented by bitmaps, wherein the measurement indication generation unit 702 may be configured to generate the channel measurement indication by performing logic operation on the bitmaps that represents the corresponding downlink subframe configuration information based on the type of the user equipment and the properties of the interferes.

In a yet further embodiment according to the present invention, the channel measurement indication is represented by a bitmap.

In a further embodiment according to the present invention, the downlink subframe configuration information can comprise backhaul link subframe configuration information and almost blank subframe configuration information.

In a still yet embodiment according to the present invention, the properties of the interferers can comprise the type of each of the interferers; and association information of each of the interferers.

In a further embodiment according to the present invention, the interferers are dominant interferes of the user equipment.

In another embodiment of the present invention, the number of dominant interferers is 2.

In a still further embodiment of the present invention, the apparatus 700 can further comprises scheduling unit 706 for performing scheduling for each subframe based on the channel quality for the subframe group reported by the user equipment.

Additionally, the present invention can further comprise an apparatus for performing downlink channel measurement, which will be described in detail with reference to FIG. 8, which illustrates an apparatus 800 for performing downlink channel measurement according to an embodiment of the present invention.

Figure 8:
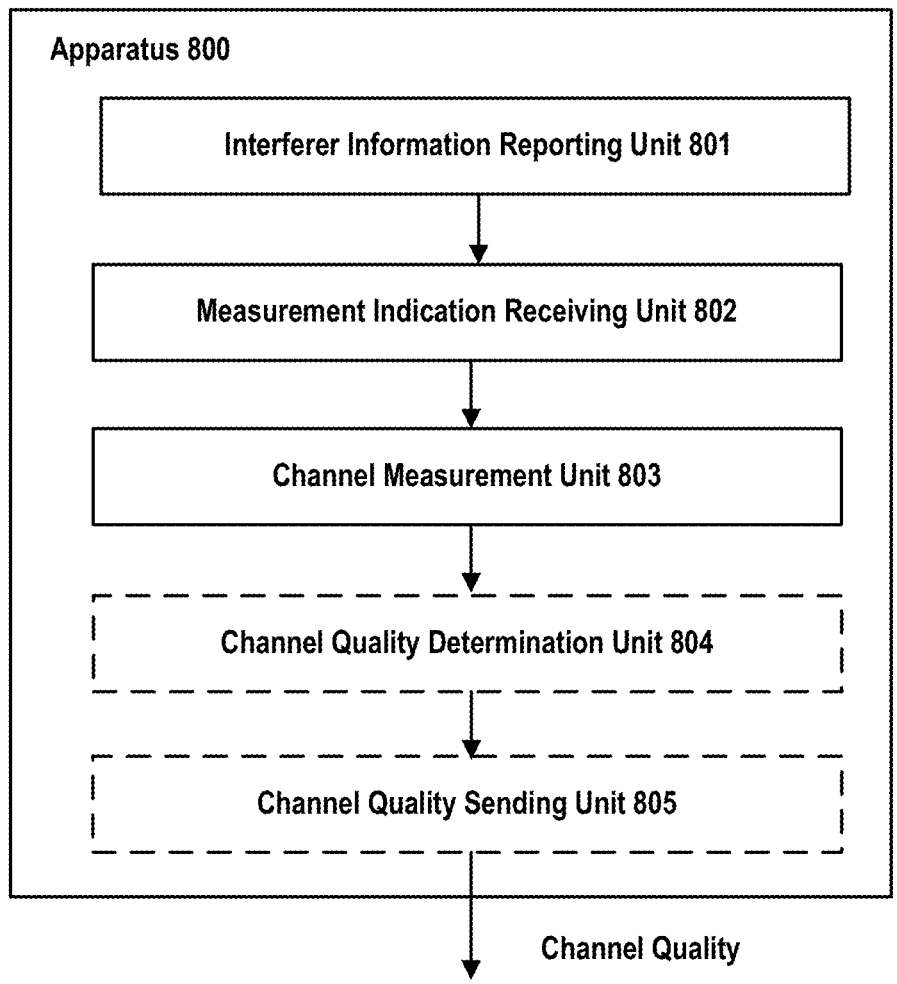
FIG. 8 schematically illustrates a block diagram of an apparatus for performing downlink channel measurement according to an embodiment of the present invention.

As illustrated in FIG. 8, the apparatus 800 may comprise an interferer information reporting unit 801, measurement indication receiving unit 802, and channel measurement unit 803. Wherein, the interferer information reporting unit 801 is configured to report information on interferers of a user equipment to a serving node, measurement indication receiving unit 802 is configured to receive a channel measurement indication from the serving node, wherein the channel measurement indication is adapted to indicate subframe groups to be measured by the user equipment, and channel measurement unit 803 that is configured to perform downlink channel measurement for the subframe group based on the channel measurement indication.

In an embodiment according to the present invention, the apparatus 800 may further comprise: channel quality determining unit 804 for determining channel quality of the subframe group from the downlink channel measurement; and channel quality sending unit 805 for sending the channel quality of the subframe group to the serving node.

It should be noted that operations of respective units as comprised in the apparatuses 700 and 800 substantially correspond to respective method steps as previously described. Therefore, for detailed operations of respective units in the apparatuses 700 and 800, please refer to the previous descriptions of the methods of the present invention with reference to FIGS. 3 to 6.

By far, the present invention has been described with reference to the accompanying drawings through particular preferred embodiments. However, it should be noted that the present invention is not limited to the illustrated and provided particular embodiments, but various modification may be made within the scope of the present invention.

Further, the embodiments of the present invention can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example by firmware.

Though the present invention has been described with reference to the currently considered embodiments, it should be appreciated that the present invention is not limited the disclosed embodiments. On the contrary, the present invention is intended to cover various modifications and equivalent arrangements falling within in the spirit and scope of the appended claims. The scope of the appended claims is accorded with broadest explanations and covers all such modifications and equivalent structures and functions.

What is claimed is:

1. A method of a node indicating downlink channel measurement in a relaying system, comprising:
    receiving, from a user equipment, information on interferers;
    generating, based on downlink subframe configuration information, at least one downlink channel measurement indication, corresponding to possible combinations of the interferers, configured to indicate a subframe group to be measured by the user equipment;
    sending the at least one downlink channel measurement indication to the user equipment, thereby instructing the user equipment to perform a downlink channel measurement corresponding to the at least one downlink channel measurement indication; and
    forming the possible combinations of the interferers received from the user equipment,
    wherein the downlink subframe configuration information is represented by bitmaps, and
    wherein the downlink channel measurement indication is generated by performing, based on a type of the user equipment and properties of the interferers, a logic operation on the bitmaps representing corresponding downlink subframe configuration information.

2. The method according to claim 1, further comprising: receiving, from the user equipment, the downlink subframe configuration information of neighboring cells.

3. The method according to claim 1, wherein the downlink channel measurement indication is represented by a bitmap.

4. The method according to claim 1, wherein the downlink subframe configuration information comprises information on a backhaul subframe configuration and information on an almost blank subframe (ABS) configuration.

5. The method according to claim 1, wherein the interferers are dominant interferers of the user equipment.

6. The method according to claim 1, further comprising: performing scheduling for each of a plurality of subframes based on a channel quality for the subframe group reported by the user equipment.

7. An apparatus for indicating downlink channel measurement in a relaying system, the apparatus comprising:
    a receiver configured to receive, from a user equipment, information on interferers;
    a transmitter configured to transmit, to the user equipment, at least one downlink channel measurement indication instructing the user equipment to perform a downlink channel measurement corresponding the at least one downlink channel measurement indication; and
    a memory storing instructions and at least one processor configured to execute the instructions and thereby implement:
    a measurement indication generation unit, for generating, based on downlink subframe configuration information, at least one downlink channel measurement indication, corresponding to possible combinations of the interferers, configured to indicate a subframe group to be measured by the user equipment,
    wherein the at least one processor further implements an interferer combination formation unit, for forming the possible combinations of the interferers received from the user equipment,
    wherein the downlink subframe configuration information is represented by bitmaps, and
    wherein the at least one processor further implements the measurement indication generation unit for generating the downlink channel measurement indication by performing, based on a type of the user equipment and properties of the interferers, a logic operation on the bitmaps representing corresponding downlink subframe configuration information.

8. The apparatus according to claim 7, wherein the receiver is further configured to receive the downlink subframe configuration information of neighboring cells.

9. The apparatus according to claim 7, wherein the downlink channel measurement indication is represented by a bitmap.

10. The apparatus according to claim 7, wherein the downlink subframe configuration information comprises information on a backhaul subframe configuration and information on an almost blank subframe (ABS) configuration.

11. The apparatus according to claim 7, wherein the interferers are dominant interferers of the user equipment.

12. The apparatus according to claim 7, the at least one processor further implements a scheduling unit for performing scheduling for each of a plurality of subframes, based on a channel quality for the subframe group reported by the user equipment.

13. A method of a user equipment performing downlink channel measurement in a relaying system, comprising:
    reporting, to a serving node of the user equipment, information on interferers of the user equipment;
    receiving, from the serving node, at least one downlink channel measurement indication, corresponding to possible combinations of the interferers, configured to indicate a subframe group to be measured by the user equipment;
    performing at least one downlink channel measurement for the subframe group based on the at least one downlink channel measurement indication; and
    forming the possible combinations of the interferers and sending the possible combinations of the interferers to the serving node;
    receiving downlink subframe configuration information,
    wherein the downlink subframe configuration information is represented by bitmaps, and
    wherein the downlink channel measurement indication is generated by performing, based on a type of the serving node and properties of the interferers, a logic operation on the bitmaps representing corresponding downlink subframe configuration information.

14. The method according to claim 13, further comprising:
    determining a channel quality for the subframe group from the downlink channel measurement; and
    sending, to the serving node; the channel quality for the subframe group.

15. An apparatus for performing downlink channel measurement in a relaying system, the apparatus comprising:
    a transmitter configured to transmit, to a serving node of the apparatus, information on interferers of the apparatus;
    a receiver configured to receive, from the serving node, at least one downlink channel measurement indication, corresponding to possible combinations of the interferers, configured to instruct the apparatus to perform a downlink channel measurement corresponding to the at least one downlink channel measurement indication; and
    a memory storing instructions and at least one processor configured to execute the instructions and thereby implement:

a channel measurement unit, for performing the downlink channel measurement for the subframe group based on the at least one downlink channel measurement indication; and forming the possible combinations of the interferers and sending the possible combinations of the interferers to the serving node;

receiving downlink subframe configuration information, wherein the downlink subframe configuration information is represented by bitmaps, and wherein the downlink channel measurement indication is generated by performing, based on a type of the serving node and properties of the interferers, a logic operation on the bitmaps representing corresponding downlink subframe configuration information.

16. The apparatus according to claim 15, wherein the at least one processor further implements:

a channel quality determination unit, for determining the channel quality for the subframe group from the downlink channel measurement; and a channel quality sending unit, for sending to the serving node, the channel quality for the subframe group.

* * * * *